(12) United States Patent
Takayanagi et al.

(10) Patent No.: US 11,608,814 B2
(45) Date of Patent: Mar. 21, 2023

(54) HELI-HOIST PLATFORM FOR WIND TURBINE

(71) Applicant: Vestas Wind Systems A/S, Aarhus N (DK)

(72) Inventors: Kazufumi Takayanagi, Tokyo (JP); Kasuya Sho, Højbjerg (DK); Lars Laursen Møller, Ulstrup (DK)

(73) Assignee: Vestas Wind Systems A/S, Aarhus N (DK)

( * ) Notice: Subject to any disclaimer, the term of this patent is extended or adjusted under 35 U.S.C. 154(b) by 130 days.

(21) Appl. No.: 17/312,136

(22) PCT Filed: Dec. 12, 2019

(86) PCT No.: PCT/EP2019/084985
§ 371 (c)(1),
(2) Date: Jun. 9, 2021

(87) PCT Pub. No.: WO2020/126860
PCT Pub. Date: Jun. 25, 2020

(65) Prior Publication Data
US 2022/0042491 A1 Feb. 10, 2022

(30) Foreign Application Priority Data
Dec. 21, 2018 (EP) .................................. 18215538

(51) Int. Cl.
*F03D 13/40* (2016.01)
*E01F 3/00* (2006.01)

(52) U.S. Cl.
CPC ............... *F03D 13/40* (2016.05); *E01F 3/00* (2013.01); *F05B 2240/14* (2013.01)

(58) Field of Classification Search
CPC ......... F03D 13/40; E01F 3/00; F05B 2240/14
See application file for complete search history.

(56) References Cited

U.S. PATENT DOCUMENTS

| | | | |
|---|---|---|---|
| 8,371,820 B2 * | 2/2013 | deBuhr | F03D 80/00 416/244 R |
| 9,133,826 B2 * | 9/2015 | Munk-Hansen | F03D 80/60 |
| 11,073,138 B2 * | 7/2021 | Munk-Hansen | F03D 80/80 |

(Continued)

FOREIGN PATENT DOCUMENTS

| | | |
|---|---|---|
| DE | 102013101239 A1 | 8/2014 |
| JP | 6008566 B2 | 10/2016 |

(Continued)

OTHER PUBLICATIONS

European Patent Office, European Search Report in EP Application No. 18215538.2, dated Jul. 9, 2019.

(Continued)

*Primary Examiner* — Aaron R Eastman
(74) *Attorney, Agent, or Firm* — Wood Herron & Evans LLP (57) ABSTRACT

A heli-hoist platform for a wind turbine includes: a deck plate accessible by a worker from a helicopter; a barrier provided along the periphery of the deck plate; and a pair of support brackets extending along a longitudinal direction of the heli-hoist platform at both ends in a width direction of the deck plate.

13 Claims, 9 Drawing Sheets

(56) References Cited

U.S. PATENT DOCUMENTS

| | | | | |
|---|---|---|---|---|
| 2005/0082839 | A1* | 4/2005 | McCoin | F03D 3/005 |
| | | | | 290/55 |
| 2011/0123336 | A1* | 5/2011 | Munk-Hansen | F03D 80/00 |
| | | | | 416/95 |
| 2012/0152651 | A1* | 6/2012 | Jensen | F03D 80/00 |
| | | | | 182/113 |
| 2012/0282095 | A1* | 11/2012 | Munk-Hansen | F03D 80/60 |
| | | | | 416/95 |
| 2013/0015665 | A1* | 1/2013 | Wang | F03D 80/60 |
| | | | | 290/55 |
| 2013/0309090 | A1* | 11/2013 | Abolfazlian | F01D 25/12 |
| | | | | 416/1 |
| 2014/0219801 | A1* | 8/2014 | Nyvad | F03D 80/60 |
| | | | | 416/146 R |
| 2017/0022966 | A1* | 1/2017 | Therkildsen | F03D 80/88 |
| 2017/0045038 | A1* | 2/2017 | Nyvad | F03D 1/04 |
| 2019/0072084 | A1* | 3/2019 | Munk-Hansen | F03D 1/00 |
| 2019/0203700 | A1* | 7/2019 | Numajiri | B66C 23/185 |
| 2019/0226460 | A1* | 7/2019 | Madsen | F03D 80/50 |
| 2020/0002908 | A1* | 1/2020 | Avner | B60P 1/5423 |
| 2020/0011302 | A1* | 1/2020 | Taubenrauch | E01F 3/00 |
| 2020/0018292 | A1* | 1/2020 | Taubenrauch | F03D 80/00 |
| 2022/0128041 | A1* | 4/2022 | Neumann | F03D 80/60 |
| 2022/0128042 | A1* | 4/2022 | Kostandyan | F03D 80/60 |
| 2022/0149680 | A1* | 5/2022 | Urresty | H02K 1/27 |
| 2022/0149697 | A1* | 5/2022 | Pittas | F01K 7/34 |
| 2022/0170388 | A1* | 6/2022 | O'Donnell | B01D 53/62 |
| 2022/0195995 | A1* | 6/2022 | Busemann | F03D 80/80 |
| 2022/0389907 | A1* | 12/2022 | Baun | F03D 9/19 |
| 2022/0389910 | A1* | 12/2022 | Nooren | F03D 13/40 |
| 2022/0396921 | A1* | 12/2022 | Frimpong | E04H 12/08 |
| 2022/0403828 | A1* | 12/2022 | Nielsen | F03D 13/40 |

FOREIGN PATENT DOCUMENTS

| | | |
|---|---|---|
| WO | 2012107049 A1 | 8/2012 |
| WO | 2018054437 A1 | 3/2018 |

OTHER PUBLICATIONS

European Patent Office, International Search Report and Written Opinion in PCT/EP2019/084985, dated Mar. 10, 2020.

* cited by examiner

HELI-HOIST PLATFORM FOR WIND TURBINE

TECHNICAL FIELD

This disclosure relates to a heli-hoist platform for a wind turbine.

BACKGROUND ART

Conventionally, there is known a heli-hoist platform provided on a nacelle of a wind turbine, for access by a worker from a helicopter to the nacelle, and a nacelle of a wind turbine equipped with such a heli-hoist platform.

For example, Patent Document 1 discloses a platform integrated to the top of a nacelle and accessible by a worker from a helicopter.

CITATION LIST

Patent Literature

Patent Document 1: JP6008566B

SUMMARY

Incidentally, on the roof of a nacelle of a wind turbine, there are cases where openings are provided for carrying in and out various equipment installed in the nacelle and for access by workers. The opening for carrying in and out the equipment can be relatively large in the center in the width direction in the limited space of the roof of the nacelle and from the front to the center in the longitudinal direction of the nacelle. Therefore, when installing the heli-hoist platform it is desirable not to hinder the use of the top of the nacelle. In this respect, in the configuration disclosed in Patent Document 1, there is room for improvement in the space utilization of the upper part of the nacelle, since the barrier wall of the platform is arranged also in front side of the nacelle roof.

In view of the above problems, at least one embodiment of the present disclosure aims to provide a heli-hoist platform that can be attached to the nacelle without disturbing the use of the top of the nacelle.

(1) A heli-hoist platform for a wind turbine, according to at least one embodiment of the present invention, includes: a deck plate accessible by a worker from a helicopter; a barrier provided along the periphery of the deck plate; and a pair of support brackets extending along a longitudinal direction of the heli-hoist platform at both ends in a width direction of the deck plate.

The longitudinal direction of the heli-hoist platform may correspond to the longitudinal direction of a nacelle when the heli-hoist platform is installed on the nacelle.

According to the above configuration (1), the deck plate of the heli-hoist platform provided with the barrier along the periphery thereof is supported by a pair of support brackets extending along the longitudinal direction of the nacelle at both ends in the width direction thereof. That is, the support bracket extending along the longitudinal direction of the nacelle is not disposed in the center portion in the width direction of the nacelle. Therefore, it is possible to provide a heli-hoist platform that can be attached to the nacelle without hindering the use of the top of the nacelle.

(2) In some embodiments, in the above configuration (1), each of the support brackets may have a connecting portion with the nacelle of the wind turbine.

According to the above configuration (2), each support bracket can be connected to the nacelle of the wind turbine via the connecting portion. As a result, the heli-hoist platform for the wind turbine can be attached to the nacelle of the wind turbine. When the heli-hoist platform is attached to the nacelle, the worker can easily access the nacelle via the helicopter without disturbing the use of the central part on the roof of the nacelle.

(3) In some embodiments, in the above configuration (1) or (2), the heli-hoist platform may further include: a cooler deck positioned behind the deck plate; and a pair of extension brackets extending rearward from rear end portions of the pair of support brackets and supporting the cooler deck.

In the case of using a cooler on the nacelle, the heli-hoist platform is entirely disposed forward if it is attempted to sufficiently secure the space of the deck plate. For this reason, it may happen that the space above the nacelle cannot be fully utilized.

In this regard, according to the above configuration (3), the cooler deck can be supported at the rear position of the deck plate by the extension bracket extending rearward from the rear end portion of each of the pair of support brackets. Therefore, for example, when the heli-hoist platform is attached to the nacelle of the wind turbine, since the cooler can be placed on the cooler deck located behind the deck plate, the use of the central portion on the roof of the nacelle is not hindered, and the cooler can be used on the nacelle without extending the longitudinal length of the nacelle itself.

(4) In some embodiments, in the above configuration (3), a bottom of the cooler deck may be positioned lower than the deck plates.

According to the above configuration (4), the bottom of the cooler deck is disposed below the deck plate and behind the deck plate. Therefore, at least a part of the cooler disposed on the cooler deck can be arranged below the deck plate and behind the deck plate. This makes it possible to lower the center of gravity of the cooler and the cooler deck in the wind turbine, and in addition, for example, when the deck plate is mounted on the nacelle, since the project area of the cooler in front view of the wind turbine can be reduced, it is possible to reduce the load due to wind. Further, for example, applying the above configuration (4) to each wind turbine constituting the wind farm including a plurality of wind turbines can reduce the loss of wake flow and improve the power generation efficiency of the entire wind farm.

(5) In some embodiments, in the above configuration (3) or (4), a bottom of the cooler deck may be positioned at the same height as a rearmost part of a roof surface of the nacelle or lower than the same.

According to the above configuration (5), the cooler deck is disposed at a level approximately equal to or lower than the rearmost end of the roof surface of the nacelle of the wind turbine. Therefore, at least a part of the cooler disposed on the cooler deck can be disposed at the same level or below the roof surface of the nacelle behind the deck plate. This makes it possible to lower the center of gravity of the cooler and the cooler deck in the wind turbine. In addition, for example, since the projected area of the cooler in the front view of the wind turbine can be reduced, the load on the wind turbine structure by the wind can be reduced. Further, for example, by applying the above configuration to each wind turbine constituting a wind farm including the plurality of wind turbines, it is possible to improve the power generation efficiency of the entire wind farm by reducing the loss of the downstream flow.

(6) In some embodiments, in any one of the above configurations (3) to (5), the pair of support brackets may extend along the longitudinal direction of the nacelle and may be formed integral or engaged with front end portions of the extension brackets, respectively.

According to the above configuration (6), since the pair of support brackets are integrally formed or fitted to the front end portions of the pair of extension brackets, respectively, it is possible to realize the extension bracket for supporting the cooler deck disposed behind the deck plate with a simple structure in which the support bracket is integrally or continuously formed or engaged with the support bracket.

(7) In some embodiments, in any one of the above configurations (3) to (6), the cooler deck may be connected to the extension bracket via a support part extending downward by a distance between the extension bracket and the cooler deck.

According to the above configuration (7), since the cooler deck is connected to the extension bracket by the support part with a lowering-distance between each extension bracket and the cooler deck, it is possible to arbitrarily set the lowering-distance, that is a distance from the extension bracket to the cooler deck, by setting the height of the support part in the vertical direction as desired.

(8) In some embodiments, in the above configuration (7), the support part may be configured to be replaceable among a plurality of types of support parts having different height.

According to the above configuration (8), since the support part is interchangeable between a plurality of kinds having different lowering-distance from the extension bracket, it is possible to selectively change the distance from the extension bracket to the cooler deck by interchanging for the support parts of the type having different lowering-distance from the extension bracket. Therefore, it is possible to arbitrarily change the lowering-distance of the cooler deck from the extension bracket by a simple structure of replacing the support part.

(9) In some embodiments, in any one of the above configurations (3) to (8), the cooler deck may be configured to be separable from the deck plate, and forms scaffold for a worker during maintenance or inspection of a cooler disposed behind the nacelle.

According to the above configuration (9), the cooler deck configured to be detachable from the deck plate functions as a scaffold for a worker at the time of maintenance or inspection of the cooler installed behind the nacelle of the wind turbine. Therefore, even when the cooler deck is arranged at different heights with respect to the deck plate, the scaffolding of the worker can be secured at the time of maintenance or inspection of the cooler. Thus, it is possible to improve the work efficiency and the safety of the workers at the time of maintenance or inspection of the cooler.

(10) In some embodiments, in any one of the above configurations (3) to (9), the heli-hoist platform may further include: a cooler disposed on the upper side of the cooler deck; and a piping extending from a device in the nacelle to the cooler.

According to the above configuration (10), the cooler is arranged above the cooler deck, and piping is provided between the cooler and the equipment in the nacelle of the wind turbine. Therefore, by configuring the piping provided in this way to circulate the refrigerant, for example, it is possible to cool the equipment in the nacelle using a cooler disposed above the cooler deck. Further, by configuring the equipment in the nacelle so as to be able to be cooled by using the cooler disposed outside the nacelle as in the above (10), the degree of freedom of design regarding the arrangement of the cooler or the equipment or the size of the nacelle itself can be improved.

(11) In some embodiments, in any one of the above configurations (1) to (10), the heli-hoist platform may further include: a plurality of sub-brackets extending in the width direction between the pair of support brackets to support the deck plate.

According to the configuration of the above (11), the deck plate can be supported by a plurality of sub brackets extending in the width direction of the deck plate in addition to the support bracket extending along the longitudinal direction at both end portions in the width direction of the deck plate. Therefore, the deck plate can be supported with a stronger structure than in the case where only the support bracket is used to support the deck plate.

(12) In some embodiments, in any one of the above configurations (1) to (11), the deck plate may include, in a plan view, a recessed portion in a front center area of the deck plate.

According to the configuration of the above (12), the recessed portion is provided in the front center area of the deck plate in plan view. By forming the recessed portion in the deck plate in this manner, for example, in the case where an opening for carrying in or carrying out an equipment to be installed inside the nacelle from above is provided on the roof surface of the nacelle, it is possible to reduce or prevent the interference between the deck plate and the door for opening and closing the opening. Further, by providing the recessed portion in the front center area of the deck plate, when the opening is provided in the roof surface of the nacelle as described above, the worker inside the barrier can access at least a part of both ends in the width direction of the opening portion (The rear end side of both ends in the width direction of the opening portion). Therefore, it is possible to improve the working efficiency and improve the safety of the workers.

(13) In some embodiments, in the above configuration (12), the deck plate may include a pair of hatch portions detachably provided on both sides of the recessed portion in the width direction.

According to the above configuration (13), by attaching and detaching the hatch portion, the worker can access below the deck plate or the region beyond the barrier on both sides of the recessed portion of the deck plate. Therefore, working efficiency can be improved.

(14) In some embodiments, in the above configuration (13), each of the hatch portions may be positioned in an area surrounded by the barrier.

According to the above configuration (14), by attaching and detaching the hatch portion, the worker can access below the deck plate inside the region surrounded by the barrier. Therefore, working efficiency can be improved.

(15) A nacelle of a wind turbine, according to at least one embodiment of the present invention, includes: a nacelle body; a cooler disposed behind the nacelle body; and a heli-hoist platform according to any one of the above configurations (1) to (14), the heli-hoist platform being attached to the nacelle body so as to be positioned forward the cooler. The nacelle body includes a rear end wall which has an exhaust opening. The nacelle further includes: a hood disposed on the nacelle body to shroud the exhaust opening from above to guide an exhaust gas from the exhaust opening downward away from the cooler.

According to the above configuration (15), a nacelle of the wind turbine capable of obtaining the effect described in any one of the above (1) to (14) is provided. The exhaust gas discharged from the exhaust opening of the rear end wall of the nacelle body is guided below the cooler by the hood. Therefore, the cooler can be disposed at a position which does not interfere with the exhaust from the exhaust opening at the rear of the nacelle body.

According to at least one embodiment of the present invention, there is provided a heli-hoist platform that can be attached to the nacelle without disturbing the use of the top of the nacelle.

DETAILED DESCRIPTION

Embodiments of the present invention will now be described in detail with reference to the accompanying drawings. It is intended, however, that unless particularly specified, dimensions, materials, shapes, relative positions and the like of components described in the embodiments shall be interpreted as illustrative only and not intended to limit the scope of the present invention.

For instance, an expression of relative or absolute arrangement such as "in a direction", "along a direction", "parallel", "orthogonal", "centered", "concentric" and "coaxial" shall not be construed as indicating only the arrangement in a strict literal sense, but also includes a state where the arrangement is relatively displaced by a tolerance, or by an angle or a distance whereby it is possible to achieve the same function.

For instance, an expression of an equal state such as "same" "equal" and "uniform" shall not be construed as indicating only the state in which the feature is strictly equal, but also includes a state in which there is a tolerance or a difference that can still achieve the same function.

Further, for instance, an expression of a shape such as a rectangular shape or a cylindrical shape shall not be construed as only the geometrically strict shape, but also includes a shape with unevenness or chamfered corners within the range in which the same effect can be achieved.

On the other hand, an expression such as "comprise", "include", "have", "contain" and "constitute" are not intended to be exclusive of other components.

Firstly, a wind power generation facility to which a helicopter platform according to at least one embodiment of the present disclosure is applied will be described.

Figure 1:
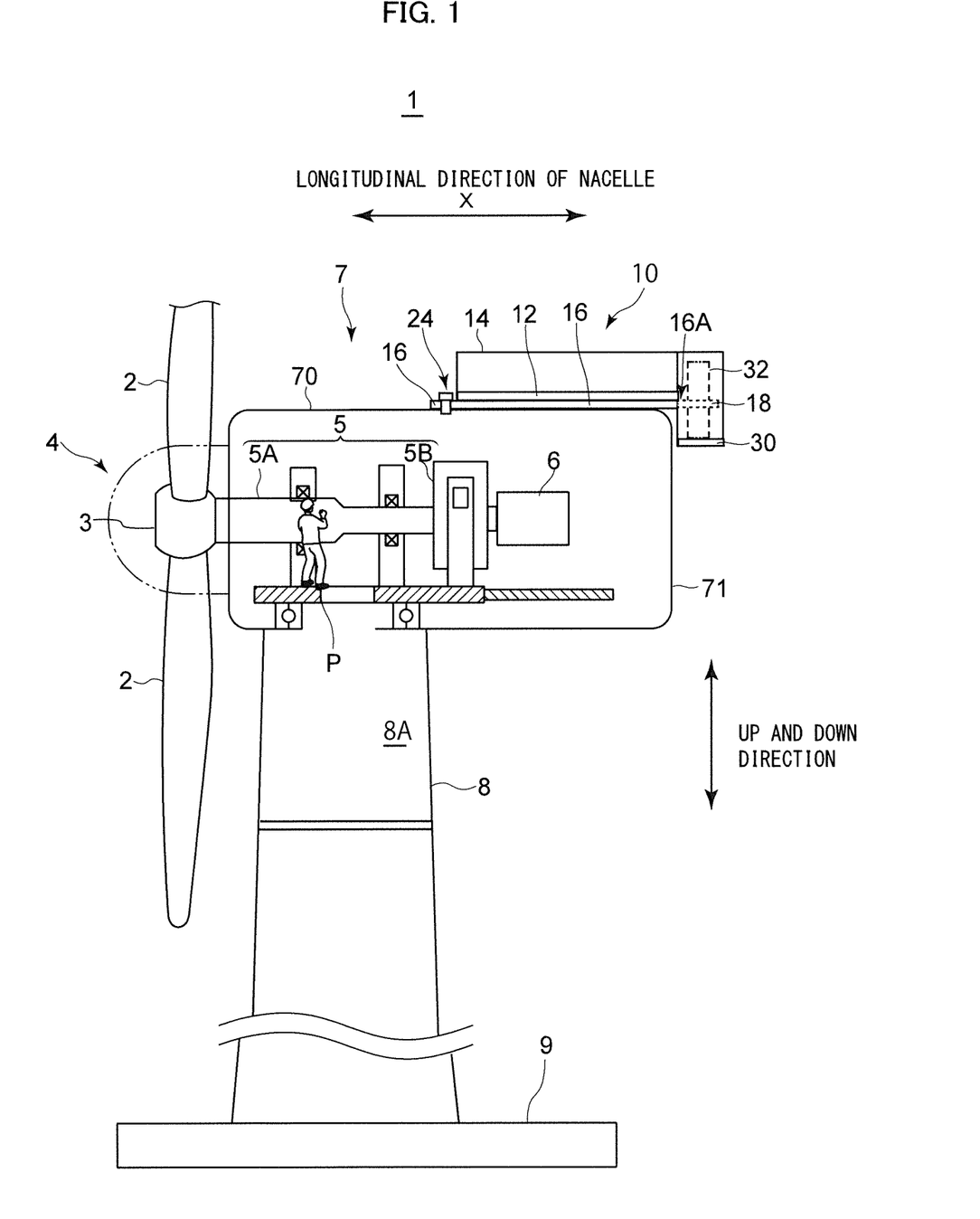
FIG. 1 is a schematic diagram showing a configuration example of a wind turbine to which a heli-hoist platform according to at least one embodiment of the present disclosure is applied.
Figure 2:
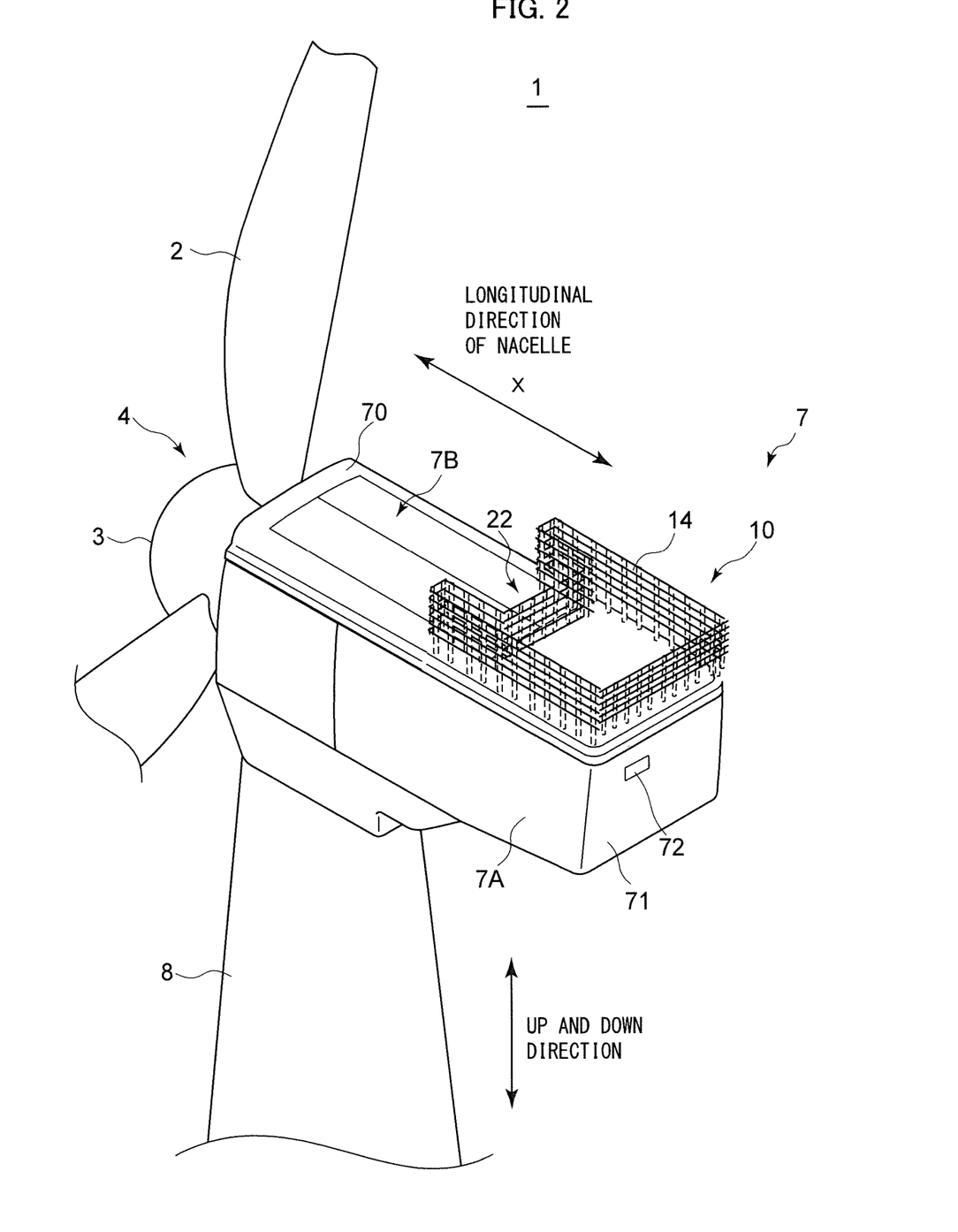
FIG. 2 is a schematic perspective view showing a configuration example of a heli-hoist platform in one embodiment of the present disclosure.

FIG. 1 is a schematic diagram showing a configuration example of a wind turbine to which a heli-hoist platform according to at least one embodiment of the present disclosure is applied. FIG. 2 is a schematic perspective view showing a configuration example of a heli-hoist platform in one embodiment of the present disclosure.

As exemplified non-limitingly in FIGS. 1 and 2, a wind power generation facility (hereinafter referred to as a wind turbine 1) according to at least one embodiment of the present disclosure includes: a rotor 4 including at least one wind blade 2, a nacelle 7 rotatably supporting the rotor 4, a tower 8 for supporting the nacelle 7 in a swingable manner, a base 9 on which the tower 8 stands upright.

The rotor 4 includes, for example, three wind blades 2 and a hub 3 to which the wind blade 2 is attached. The rotor 4 is rotatably supported by the nacelle 7 via a drive train 5 including a main shaft 5A coupled to the rotor 4 so as to be integrally rotatable, and an increasing gear 5B. The rotational energy of the drive train 5 is converted into electric energy by the generator 6, thereby electric power is generated.

A heli-hoist platform 10 for a wind turbine according to at least one embodiment of the present invention includes: a deck plate 12 accessible by a worker P from a helicopter (not shown); a barrier 14 provided along the periphery of the deck plate 12; and a pair of support brackets 16 (see FIG. 5 and FIG. 9) extending along a longitudinal direction X of the nacelle 7 at both ends E in a width direction W of the deck plate 12.

The barrier 14 may include, for example, a handrail, a plate (with holes), a net, a (metal) grid and/or a cooler part.

Here, on a roof 70 of the nacelle 7 of the wind turbine 1, there are cases where an opening 7B (see FIG. 2, FIG. 3 and FIG. 5) is provided for carrying in and out various equipment (not shown) to be installed in the nacelle 7 and for access by workers P. The opening 7B may be relatively large and may be provided in the center of a limited space of the roof 70 of the nacelle 7 or from the front to the center in the longitudinal direction X of the nacelle 7.

In this regard, according to the above configuration, the deck plate 12 of the heli-hoist platform 10 provided with the barrier 14 along the periphery thereof is supported by a pair of support brackets 16 extending along the longitudinal direction X of the nacelle 7 at both ends E in the width direction W thereof. That is, the support bracket 16 extending along the longitudinal direction X of the nacelle 7 is not disposed in the center portion in the width direction W of the nacelle 7. Therefore, it is possible to provide a heli-hoist platform 10 that can be attached to the nacelle 7 without hindering the use of the top of the nacelle 7.

The support bracket 16 can be formed to extend rearward along the longitudinal direction X.

Figure 3:
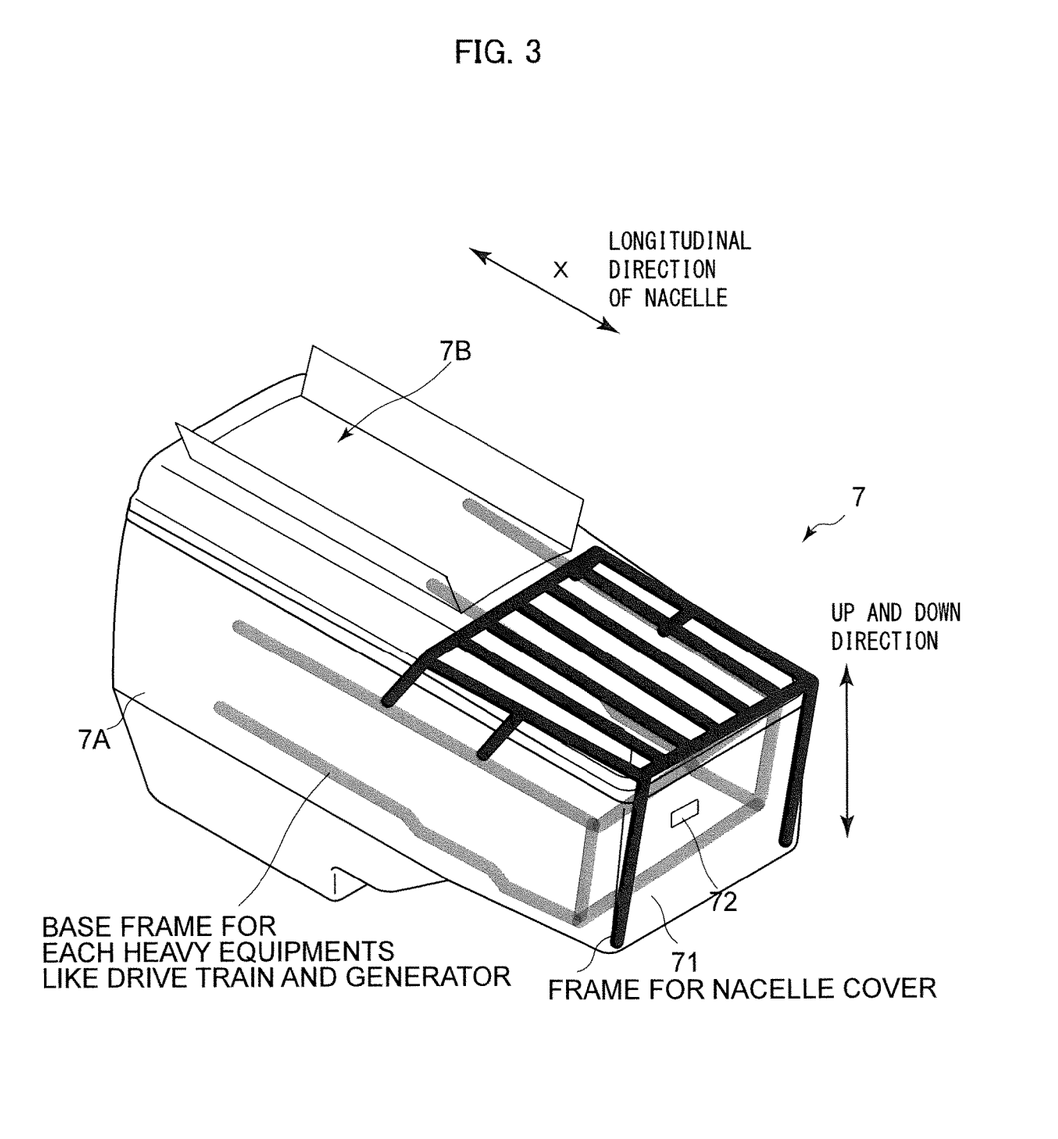
FIG. 3 is a view showing a frame structure of a nacelle in one embodiment of the present disclosure.

FIG. 3 shows the frame structure of the nacelle 7. The frame in the nacelle 7 mainly includes a support base plate-like portion (base frame portion) for attaching the device and a frame portion for supporting the nacelle cover. The support bracket 16 is attached to the frame among the portions. The heli-hoist platform 10 is heavy, therefore it is desirable to use a frame that is also supported by the support base plate.

In some embodiments, each of the support brackets 16 may have a connecting portion 24 with the nacelle 7 of the wind turbine 1 (see FIG. 1). The connecting portion 24 may include a fastening member such as a screw or a bolt nut.

According to the above configuration, each support bracket 16 can be connected to the nacelle 7 of the wind turbine 1 via the connecting portion 24. As a result, the heli-hoist platform 10 for the wind turbine 1 can be attached to the nacelle 7 of the wind turbine 1. When the heli-hoist platform 10 is attached to the nacelle 7, the worker P can easily access the nacelle 7 via the helicopter without disturbing the use of the central part on the roof 70 of the nacelle 7.

In some embodiments, the heli-hoist platform 10 may further include: a cooler deck 30 positioned behind the deck plate 12; and a pair of extension brackets 18 extending rearward from rear end portions 16A of the pair of support brackets 16 and supporting the cooler deck 30 (see FIG. 1).

In the case of using a cooler 32 on the nacelle 7, the heli-hoist platform 10 is entirely disposed forward if it is attempted to sufficiently secure the space of the deck plate 12. For this reason, it may happen that the space above the nacelle 7 cannot be fully utilized.

In this regard, as described above, the cooler deck 30 can be supported at the rear position of the deck plate 12 by the extension bracket 18 extending rearward from the rear end portion 16A of each of the pair of support brackets 16. Therefore, for example, when the heli-hoist platform 10 is attached to the nacelle 7 of the wind turbine 1, since the cooler 32 can be placed on the cooler deck 30 located behind the deck plate 12, the use of the central portion on the roof 70 of the nacelle 7 is not hindered, and the cooler 32 can be used on the nacelle 7 without extending the length of the nacelle 7 itself in the longitudinal direction X.

Figure 4A:
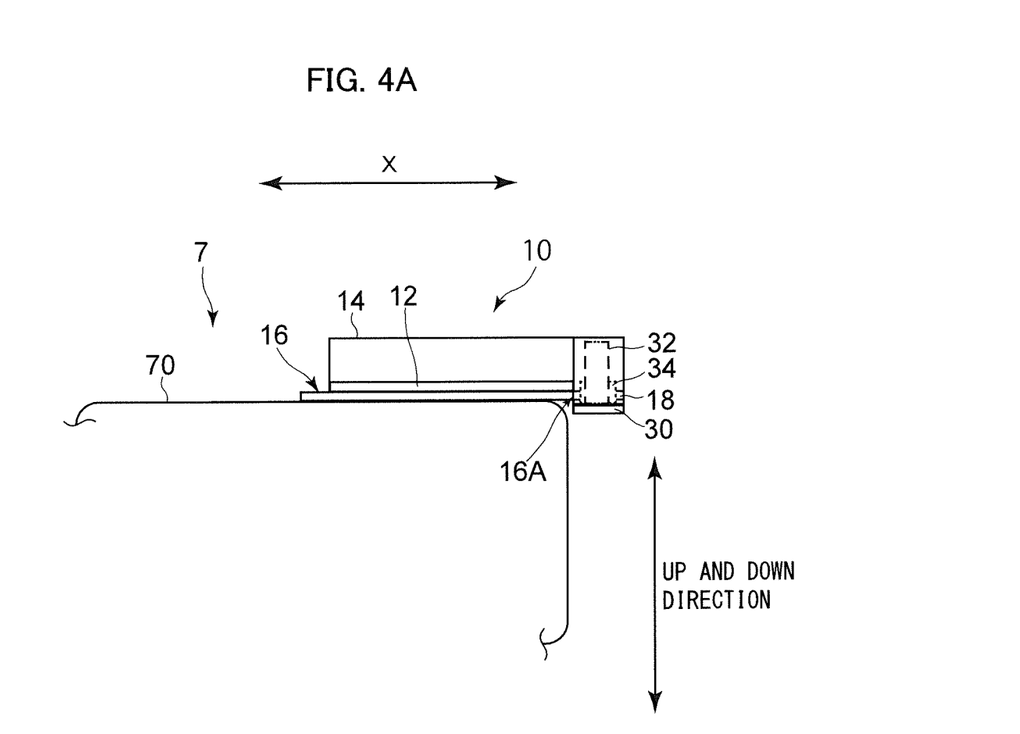
FIG. 4A is a schematic side view showing an arrangement of a cooler deck in some embodiments of the present disclosure.
Figure 4B:
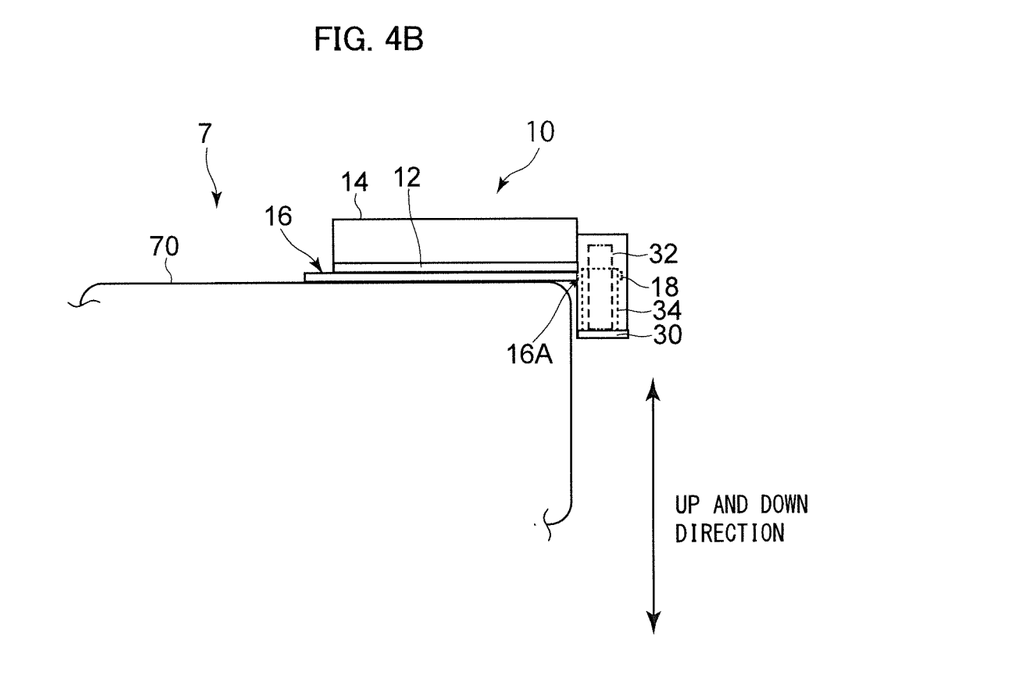
FIG. 4B is a schematic side view showing an arrangement of a cooler deck in some embodiments of the present disclosure.

In some embodiments, the bottom of the cooler deck 30 may be positioned at the same height as a rearmost roof surface of the nacelle 7 or lower than the same (see FIG. 4A, for example).

According to the configuration, the cooler deck 30 is disposed at a level approximately equal to or lower than the rearmost end of the roof surface 70 of the nacelle 7 of the wind turbine 1. Therefore, at least a part of the cooler 32 disposed on the cooler deck 30 can be disposed at the same level or below the roof surface 70 of the nacelle 7 behind the deck plate 12. This makes it possible to lower the center of gravity of the cooler 32 and the cooler deck 30 in the wind turbine 1. In addition, for example, since the projected area of the cooler 32 in the front view of the wind turbine 1 can be reduced, the load on the wind turbine structure by the wind can be reduced. Further, for example, by applying the above configuration to each wind turbine constituting the wind farm 40 including the plurality of wind turbines 1, it is possible to improve the power generation efficiency of the entire wind farm 40 by reducing the loss of the downstream flow.

In some embodiments, the bottom of the cooler deck 30 may be positioned lower than the deck plates 12 (see FIGS. 1, 4B, 7 and 8, for example).

According to this configuration, the bottom of the cooler deck 30 is disposed below the deck plate 12 and behind the deck plate 12. Therefore, at least a part of the cooler 32 disposed on the cooler deck 30 can be arranged below the deck plate 12 and behind the deck plate 12. This makes it possible to lower the center of gravity of the cooler 32 and the cooler deck 30 in the wind turbine 1, and in addition, for example, when the deck plate 12 is mounted on the nacelle 7, since the project area of the cooler 32 in front view of the wind turbine 1 can be reduced, it is possible to reduce the load due to wind. Further, for example, applying the above configuration to each wind turbine 1 constituting the wind farm 40 including a plurality of wind turbines 1 can reduce the loss of wake flow and improve the power generation efficiency of the entire wind farm 40.

Figure 5:
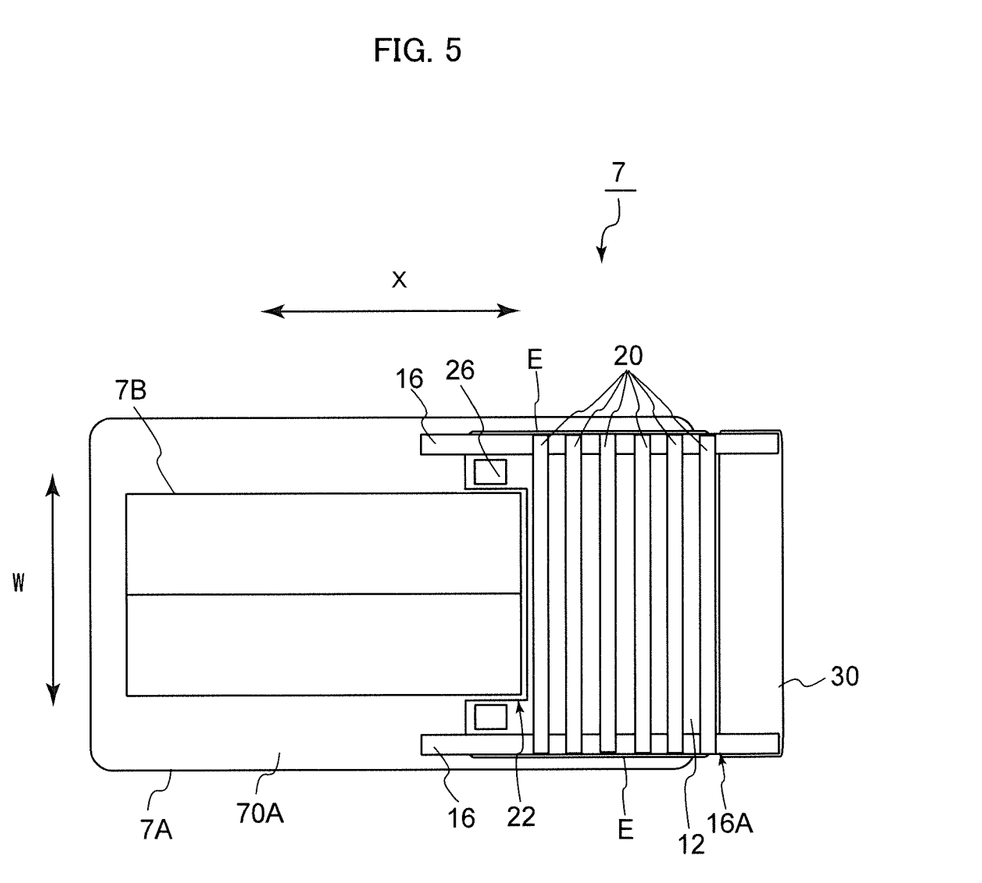
FIG. 5 is a plan view showing a configuration example of a heli-hoist platform in one embodiment of the present disclosure.
Figure 9:
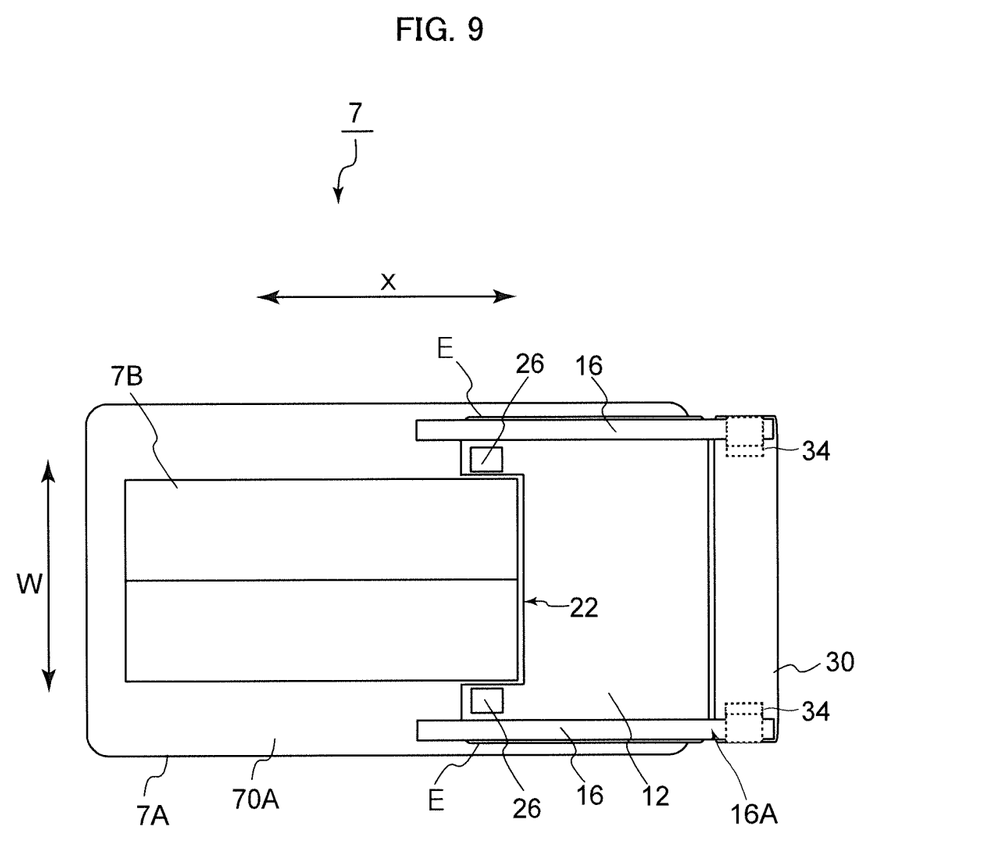
FIG. 9 is a plan view showing a configuration example of a heli-hoist platform according to one embodiment of the present disclosure.

In some embodiments, the pair of support brackets 16 may extend along the longitudinal direction X of the nacelle 7 and may be formed integral or engaged with the front end portions 18A of the extension brackets 18, respectively (see FIGS. 5 and 9, for example).

According to this configuration, since the pair of support brackets 16 are integrally formed or fitted to the front end portions 18A of the pair of extension brackets 18, respectively, it is possible to realize the extension bracket 18 for supporting the cooler deck 30 disposed behind the deck plate 12 with a simple structure in which the extension bracket 18 is integrally or continuously formed or engaged with the support bracket.

In some embodiments, the cooler deck 30 may be connected to the extension bracket via a support part 34 with a lowering-distance, L, between the extension bracket 18 and the cooler deck 30 (see FIGS. 1, 4B, 6 and 8, for example).

According to this configuration, since the cooler deck 30 is connected to the extension bracket 18 by the support part 34 with a lowering-distance L between the extension bracket 18 and the cooler deck 30, it is possible to arbitrarily set the lowering-distance L, that is a distance from the extension bracket 18 to the cooler deck 30, by setting the height of the support part 34 in the vertical direction as desired.

Figure 6A:
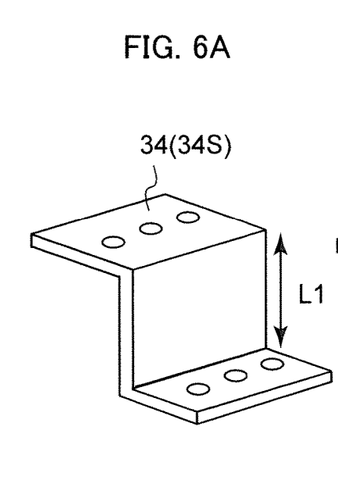
FIG. 6A shows an example of a support part in some embodiments of the present disclosure.
Figure 6B:
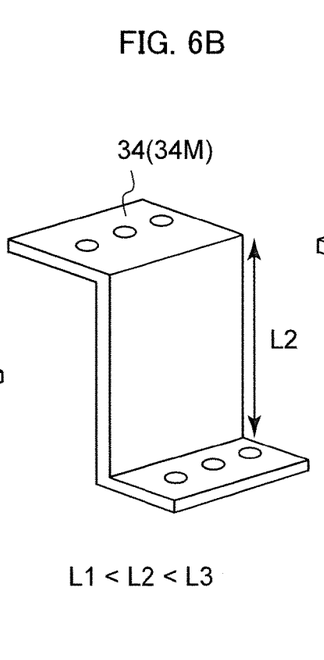
FIG. 6B shows an example of a support part in some embodiments of the present disclosure.
Figure 6C:
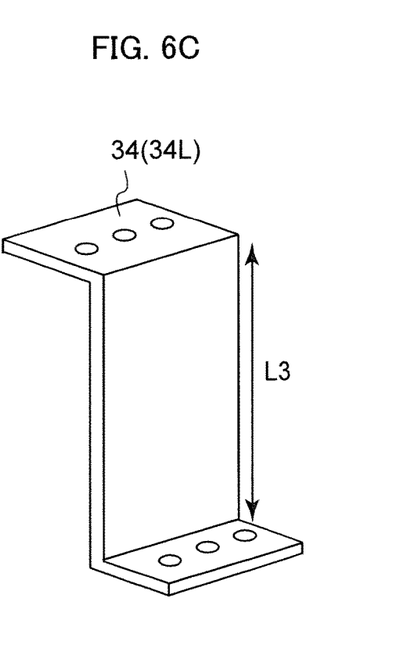
FIG. 6C shows an example of a support part in some embodiments of the present disclosure.

In some embodiments, the support part 34 may be configured to be interchangeable between different types in each of which the lowering-distance L from the extension bracket differs (see FIG. 6A, FIG. 6B, and FIG. 6C, for example).

According to this configuration, since the support part 34 is interchangeable between a plurality of kinds having different lowering-distance L from the extension bracket 18, it is possible to selectively change the distance from the extension bracket 18 to the cooler deck 30 by interchanging the support parts 34 of the type having different lowering-distance L from the extension bracket 18. Therefore, it is possible to arbitrarily change the lowering-distance L of the cooler deck 30 from the lower end of the support bracket 16 by a simple structure of replacing the support part 34.

In some embodiments, the cooler deck 30 may be configured to be separable from the deck plate 12, and forms scaffold for a worker P during maintenance or inspection of a cooler 32 disposed behind the nacelle 7 (see FIGS. 1, 4B, 6 and 8, for example).

According to this configuration, the cooler deck 30 configured to be detachable from the deck plate 12 functions as a scaffold for a worker P at the time of maintenance or inspection of the cooler 32 installed behind the nacelle 7 of the wind turbine 1. Therefore, even when the cooler deck 30 is arranged at different heights with respect to the deck plate 12, the scaffolding of the worker P can be secured at the time of maintenance or inspection of the cooler 32. Thus, it is possible to improve the work efficiency and the safety of the workers P at the time of maintenance or inspection of the cooler 32.

In some embodiments, the heli-hoist platform 10 may further include: a plurality of sub-brackets 20 extending in the width direction W between the pair of support brackets 16 to support the deck plate 12 (see FIG. 5, for example).

Here, as shown in FIG. 3, the frame in the nacelle 7 mainly includes a support base plate-like portion (base frame portion) for attaching the equipment (not shown) to be installed in the nacelle 7 and a frame portion for supporting the nacelle cover. Since the heli-hoist platform 10 is heavy, the sub bracket 20 as well as the support bracket 16 can be attached more firmly to the nacelle 7 when attached to the frame.

According to this configuration, the deck plate 12 can be supported by a plurality of sub-brackets 20 extending in the width direction W of the deck plate 12 in addition to the support bracket 16 extending along the longitudinal direction X at both end portions E in the width direction W of the deck plate 12. Therefore, the deck plate 12 can be supported with a stronger structure than in the case where only the support bracket 16 is used to support the deck plate 12.

Figure 7:
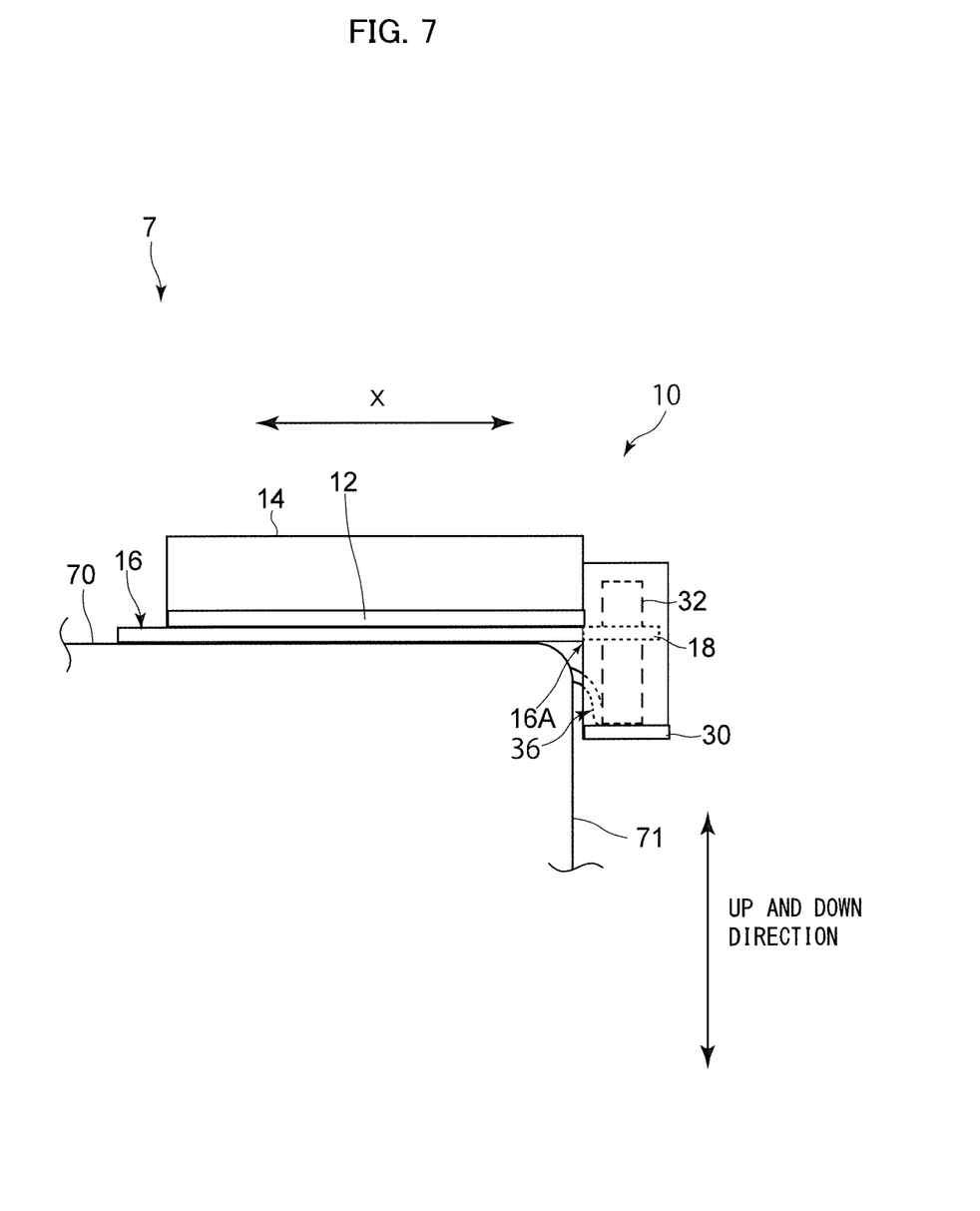
FIG. 7 is a diagram illustrating a configuration example of a cooler deck according to some embodiments of the present disclosure.

In some embodiments, the heli-hoist platform 10 may further include: a cooler 32 disposed on the upper side of the cooler deck 30; and a piping 36 extending from a device in the nacelle 7 to the cooler 32 (see FIG. 7, for example).

According to this configuration, since the cooler 32 is arranged above the cooler deck 30, and the piping 36 is provided between the cooler 32 and the equipment in the nacelle 7 of the wind turbine 1, it is possible to cool the equipment in the nacelle 7 using a cooler 32 disposed above the cooler deck 30 by configuring the piping 36 provided in this way to circulate the refrigerant, for example. Further, by configuring the equipment in the nacelle 7 so as to be able to be cooled by using the cooler 32 disposed outside the nacelle 7 as described above, the degree of freedom of design regarding the arrangement of the cooler 32 or the equipment or the size of the nacelle 7 itself can be improved.

In some embodiments, the deck plate 12 may include, in a plan view, a recessed portion 22 in a front center area of the deck plate 12 (see FIG. 2, for example).

According to this configuration, since the recessed portion 22 is provided in the front center area of the deck plate 12 in plan view, in the case where an opening 7B for carrying in or carrying out an equipment to be installed inside the nacelle 7 from above is provided on the roof 70 of the nacelle 7, it is possible to reduce or prevent the interference between the deck plate 12 and the door for opening and closing the opening 7B by forming the recessed portion 22 in the deck plate 12 in the above manner, for example. Further, by providing the recessed portion 22 in the front center area of the deck plate 12, when the opening 7B is provided in the roof 70 of the nacelle 7 as described above, the worker P inside the barrier 14 can access at least a part (rear end side of both ends E in the width direction W of the opening 7B, for example) of both ends E in the width direction W of the opening 7B. Therefore, it is possible to improve the working efficiency and improve the safety of the worker P.

In some embodiments, the deck plate 12 may include a pair of hatch portions 26 detachably positioned at both ends E of the recessed portion 22 (see FIG. 9, for example).

According to this configuration, by attaching and detaching the hatch portion 26, the worker P can access below the deck plate 12 or the region beyond the barrier 14 on both sides of the recessed portion 22 of the deck plate 12. Therefore, working efficiency can be improved.

In some embodiments, each of the hatch portions 26 may be positioned in an area surrounded by the barrier 14.

According to this configuration, by attaching and detaching the hatch portion 26, the worker P can access below the deck plate 12 inside the region surrounded by the barrier 14. Therefore, working efficiency can be improved.

A nacelle 7 of a wind turbine 1, according to at least one embodiment of the present invention, includes: a nacelle proper 7A; a cooler 32 disposed behind the nacelle proper 7A; and the heli-hoist platform 10 according to any one of the above configurations. The platform 10 may be attached to the nacelle proper 7A at a portion forward and higher than the cooler 32 (see FIG. 1, for example).

The nacelle proper 7A includes a rear end wall 71 which has an exhaust exit 72 (exhaust opening). The nacelle 7 further includes: a hood 38 disposed on the nacelle proper 7A to shroud the exhaust exit 72 from an upward position to guide exhaust gas from the exhaust exit 72 down below the cooler 32 (see FIGS. 2 and 8, for example).

Figure 8:
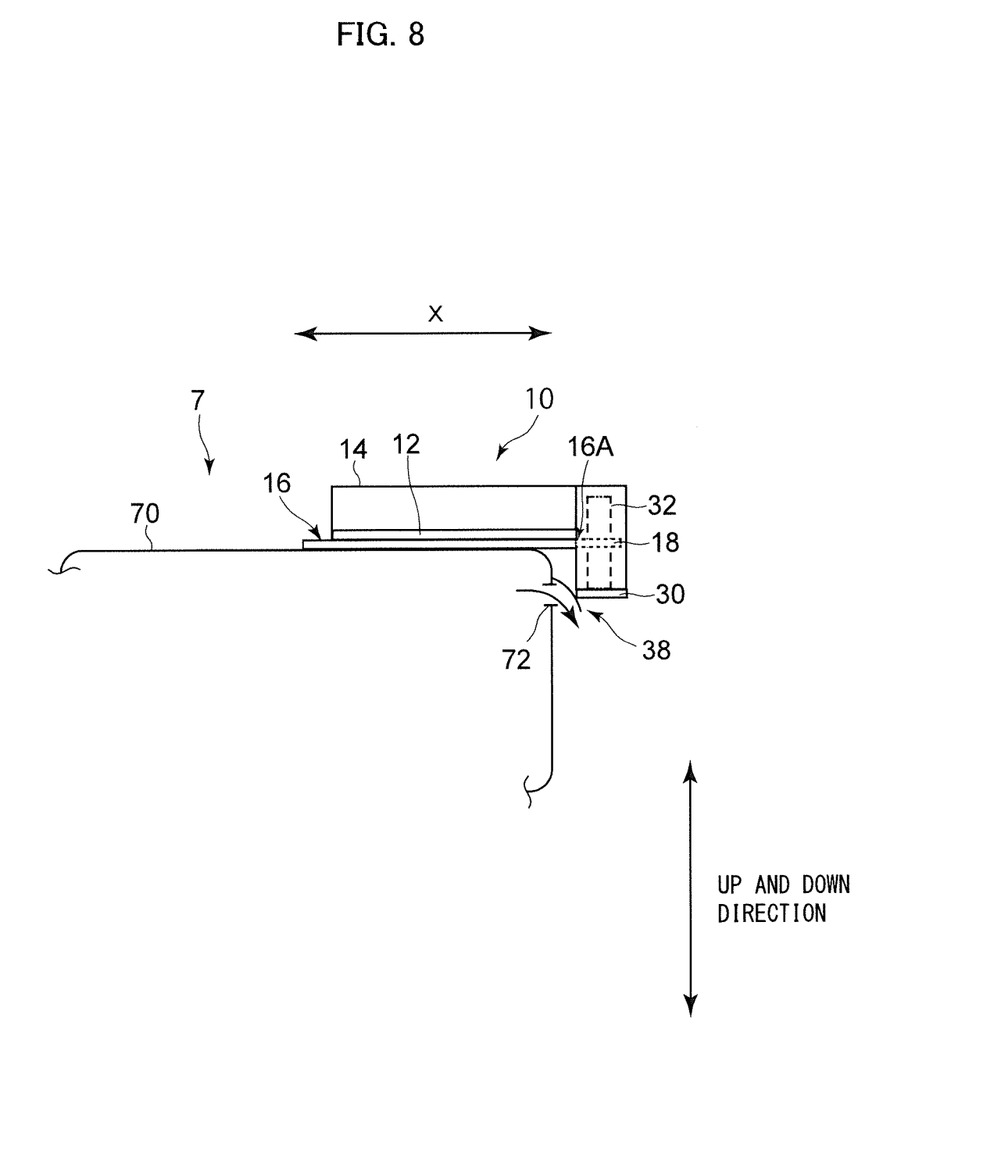
FIG. 8 is a schematic side view showing a configuration example of a nacelle according to one embodiment of the present disclosure.

According to the above configuration, a nacelle 7 of the wind turbine 1 capable of obtaining the effect described in any one of the above configurations is provided. The exhaust gas discharged from the exhaust exit 72 of the rear end wall 71 of the nacelle proper 7A is guided below the cooler 32 by the hood 38. Therefore, the cooler 32 can be disposed at a position which does not interfere with the exhaust from the exhaust exit 72 at the rear of the nacelle proper 7A.

According to at least one embodiment of the present invention, there is provided a heli-hoist platform 10 that can be attached to the nacelle 7 without disturbing the use of the top of the nacelle 7.

Embodiments of the present invention were described in detail above, but the present invention is not limited thereto, and various amendments and modifications may be implemented.

The invention claimed is:

1. A heli-hoist platform for a wind turbine, comprising:
    a deck plate accessible by a worker from a helicopter;
    a barrier provided along a periphery of the deck plate;
    a pair of support brackets extending along a longitudinal direction of the heli-hoist platform at both ends in a width direction of the deck plate;
    a cooler deck positioned behind the deck plate; and
    a pair of extension brackets extending rearward from rear end portions of the pair of support brackets and supporting the cooler deck,
    wherein a bottom of the cooler deck is positioned lower than the deck plate.

2. The heli-hoist platform for a wind turbine according to claim 1,
    wherein each of the pair of support brackets has a connecting portion with a nacelle of the wind turbine.

3. The heli-hoist platform for a wind turbine according to claim 1,
    wherein the bottom of the cooler deck is positioned at the same height as a rearmost part of a roof surface of a nacelle of the wind turbine or lower than the same.

4. The heli-hoist platform for a wind turbine according to claim 1,
    wherein the pair of support brackets extends along the longitudinal direction of a nacelle of the wind turbine and is formed integral or engaged with front end portions of the extension brackets, respectively.

5. The heli-hoist platform for a wind turbine according to claim 1,
    wherein the cooler deck is connected to each of the pair of extension brackets via a support part extending downward by a distance between a bottom of the respective support bracket from which the extension bracket extends and the bottom of the cooler deck.

6. The heli-hoist platform for a wind turbine according to claim 5,
wherein the support part is configured to be replaceable among a plurality of types of support parts having different height.

7. The heli-hoist platform for a wind turbine according to claim 1,
wherein the cooler deck is configured to be separable from the deck plate, and forms scaffold for the worker during maintenance or inspection of a cooler disposed behind the nacelle.

8. The heli-hoist platform for a wind turbine according to claim 1, further comprising:
a cooler disposed on an upper side of the cooler deck; and
a piping extending from a device in a nacelle of the wind turbine to the cooler.

9. The heli-hoist platform for a wind turbine according to claim 1, further comprising:
a plurality of sub-brackets extending in the width direction between the pair of support brackets to support the deck plate.

10. The heli-hoist platform for a wind turbine according to claim 1,
wherein the deck plate includes, in a plan view, a recessed portion in a front center area of the deck plate.

11. The heli-hoist platform for a wind turbine according to claim 10,
wherein the deck plate includes a pair of hatch portions detachably provided on both sides of the recessed portion in the width direction.

12. The heli-hoist platform for a wind turbine according to claim 11,
wherein each of the hatch portions is positioned in an area surrounded by the barrier.

13. A nacelle of a wind turbine, comprising:
a nacelle body;
a cooler disposed behind the nacelle body; and
a heli-hoist platform according to claim 1, the heli-hoist platform being attached to the nacelle body so as to be positioned forward of the cooler,
wherein the nacelle body includes a rear end wall which has an exhaust opening, and
the nacelle further comprising:
a hood disposed on the nacelle body to shroud the exhaust opening from above to guide an exhaust gas from the exhaust opening downward away from the cooler.

* * * * *